United States Patent
Fukashiro

(10) Patent No.: US 7,877,011 B2
(45) Date of Patent: Jan. 25, 2011

(54) OPTICAL SWITCH AND OPTICAL CROSSCONNECT APPARATUS

(75) Inventor: Yasuyuki Fukashiro, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 636 days.

(21) Appl. No.: 11/987,398

(22) Filed: Nov. 29, 2007

(65) Prior Publication Data

US 2008/0124078 A1    May 29, 2008

(30) Foreign Application Priority Data

Nov. 29, 2006    (JP) .............................. 2006-321018

(51) Int. Cl.
*H04J 14/00* (2006.01)

(52) U.S. Cl. ........................................ 398/56
(58) Field of Classification Search .................... 398/56
See application file for complete search history.

(56) References Cited

U.S. PATENT DOCUMENTS

| 6,859,576 B2 * | 2/2005 | Kim et al. ...................... 385/17 |
| 2002/0024949 A1 | 2/2002 | Tomonaga et al. |

FOREIGN PATENT DOCUMENTS

| JP | 2002-77238 | 3/2002 |
| JP | 2002-182250 | 6/2002 |

* cited by examiner

*Primary Examiner*—Shi K Li
(74) *Attorney, Agent, or Firm*—McDermott Will & Emery LLP

(57) ABSTRACT

An optical switch is constructed by: first and second optical switches each having ports of k inputs and k outputs; a third optical switch of k inputs and k outputs which can perform a bi-directional transmission; 2k first optical circulators; 2k second optical circulators; and 2k selecting switches. First to kth interfaces are connected by the first optical switch. (k+1)th to 2kth interfaces are connected by the second optical switch. The first to kth interfaces are connected to one of the (k+1)th to 2kth interfaces by the third optical switch. An optical crossconnect apparatus is also provided.

4 Claims, 8 Drawing Sheets

| INPUT PORT | OUTPUT PORT |
|---|---|
| 1 | 2 |
| 2 | 3 |
| 3 | 1 |

FIG. 8

| I/F UNIT | SELECTING SWITCH | BASE SWITCH | EXPANDING SWITCH |
|---|---|---|---|
| IF 1 | SEL 1 | OSW-B1 | PORT 1 |
| ... | ... | ... | ... |
| IF k | SEL k | OSW-B1 | PORT k |
| IF k+1 | SEL k+1 | OSW-B2 | PORT k+1 |
| ... | ... | ... | ... |
| IF 2k | SEL 2k | OSW-B2 | PORT 2k |

214

OPTICAL SWITCH AND OPTICAL CROSSCONNECT APPARATUS

CLAIM OF PRIORITY

The present application claims priority from Japanese application JP-2006-321018 filed on Nov. 11, 2006 the content of which is hereby incorporated by reference into this application.

BACKGROUND OF THE INVENTION

1. Field of the Invention

The invention relates to an optical transmission system and an optical network which are used in a trunk network that covers communication among foreign countries or in the whole country, an intraprefecture network, or the like and, more particularly, to an optical crossconnect apparatus for making a path switching and a bandwidth management of an optical signal.

2. Description of the Related Art

The realization of a large transmission capacity of a communication network is progressing due to a rapid increase in recent data traffic represented by the Internet. Nowadays, since the realization of the optical transmission has been put into practical use, the transmission capacity is increasing by using a time division multiplexing (hereinbelow, abbreviated to TDM) or a wavelength division multiplexing (hereinbelow, abbreviated to WDM). For example, the following transmitting apparatuses have been put into practical use: a transmitting apparatus which can transmit data of 10 gigabits per second per channel; and a wavelength multiplexing transmitting apparatus of a point-to-point type in which channels as many as a few to tens of channels are wavelength multiplexed to one optical fiber by using one fiber and a long-distance transmission exceeding hundreds of kilometers can be possible by using optical amplifiers, regenerators, or the like.

In order to cope with a future increase in demand of the transmission capacity, further economic cost performance, and a variety of services, the following optical networks have been being examined: a ring type optical network in which communication nodes have been connected in a ring shape; and a mesh type optical network in which communication nodes have been connected in a mesh shape in order to increase a degree of freedom of the path route selection. In such optical networks, the following advantages can be expected: the operation is simplified by a network control and management system which supervises each node apparatus in remote-universal manner; what is called an end-to-end path management from a start point to an end point of a circuit is made easy or a path setting speed is raised by the interlocking of monitoring and control units of the node apparatuses. Further, by forming the optical network as a mesh type, a path which needs spare capacity can select a spare capacity in the mesh network, so that there is considered that a spare capacity can be shared by a plurality working paths and the whole network can be economically realized.

To realize the mesh type optical network as mentioned above, there is being developed an apparatus called an optical signal switching apparatus or an optical crossconnect apparatus in which optical signals such as low-speed optical signal like STM-1/OC-3 or the like and high-speed optical signal like STM-64/OC-192, 10GigaBit Ethernet (registered trademark), STM-256/OC-768, or the like can be accommodated as an input/output interface, and a bandwidth management, a path switching, or a switching to a spare apparatus is performed. According to the optical crossconnect apparatus, a connecting relation between the transmission lines connected to a certain node or a connecting relation between the transmission lines and a user apparatus can be changed in an autonomous distributed control manner or a remote and centralized control manner.

In an optical crossconnect apparatus of what is called an O-E-O (optical-electric-optical) type, although the interface between the transmission line out of the apparatus and the user apparatus are optical signals, the efficient signal switching can be realized, since signal switching and line editing processes in the apparatus are realized by an electronic circuit on a unit basis smaller than transmission rate basis, for example, on a unit basis of STS-1 unit which is smaller than that of, for example, STM-64 or OC-192. In an optical crossconnect apparatus of what is called an O-O-O type in which the optical signal is not converted into an electric signal but the switching is performed by using an optical switch, it is expected that information of a large capacity in correspondence to an amount of information which need to be processed in a node which is difficult to be processed by the electronic circuit of the O-E-O type optical crossconnect apparatus can be processed in an O-O-O type optical crossconnect. The O-O-O type optical crossconnect apparatus also includes an optical crossconnect apparatus with a construction in which the optical signal was temporarily converted into the electric signal for a quality monitoring of the signal and a regenerating process at the input or output unit of the optical switch, and it is again processed as an optical signal by the optical switch.

In the case where the number of wavelength in the wavelength multiplexing transmission is increased in order to further increase the transmission capacity, in the node in which fibers from a plurality of lines are accommodated, in order to assure a degree of freedom of connection at the time of connecting the wavelength signals from the lines, it is indispensable to increase the capacity of the optical switch of the optical crossconnect apparatus arranged at the node. As techniques for realizing the optical switch, at present, the following switches have been known: a semiconductor switch or an LiNO3 switch using a refractive index change which is caused by applying an electric field to a material; a PLC (Planar Lightwave Circuit) type switch using a refractive index change which is caused by applying a heat to a material; a movable type optical switch which moves a position of an optical fiber or a lens by using an electromagnet; an MEMS (Micro-Electro-Mechanical Systems) type switch which controls small mirrors formed by a semiconductor technique by using an electrostatic force; and the like.

As MEMS type switches, a 2D type switch and a 3D type switch have been known. According to the 2D type switch, the mirrors are two-dimensionally arranged like a lattice in the vertical and lateral directions and a path of light is switched depending on whether or not the mirror is inserted onto the optical path of an optical signal. Although the mirrors can be simply controlled, since the number of mirrors increases in proportion to the square of the number of input/output ports, it is generally considered to be difficult to construct the optical switch of a scale exceeding 32 inputs and 32 outputs. For example, in order to realize 16 inputs and 16 outputs, 256 (=16²) mirror elements are necessary.

According to the 3D type switch, the direction of an optical signal is controlled by continuously changing an angle of a mirror. The 3D type switch is expected as a technique for realizing an optical switch of a large scale exceeding, for example, 32 inputs and 32 outputs. According to the 3D type switch, even in the case of, for example, 32 inputs and 32 outputs, it is sufficient to use the 64 mirror elements in total including 32 mirror elements for the inputs and 32 mirror elements for the outputs. However, according to the 3D type switch, although the number of necessary mirror elements is small, control of the mirrors is complicated more than that of the 2D type switch.

In the case of realizing the optical switch of the large scale by the foregoing optical switch techniques, a method of using one optical switch of a large scale and a method of combining a plurality of optical switches of a small scale are considered. The method of using one optical switch of the large scale has such a problem that an expansion according to the scale of the node cannot be performed. At present, there is a limitation of a scale of the switch which is commercially available from viewpoints of a manufacturing technique and costs. For example, in the 3D type MEMS switch, a scale using up to about (64×64) to (128×128) mirror elements has been realized.

When considering that, at present, there is a limitation in the scale of the optical switch which can be realized by one optical switch and also considering the expandability, it is a practical way to configure the optical switch of the large scale by combining a plurality of optical switches of a small scale. For example, a Clos network in which an optical switch is configured by three stages has been known. As a related art using such an idea, there is JP-A-2002-182250. According to JP-A-2002-182250, a large scale is realized by configuring the optical switch by three stages and, further, a scale of hardware is reduced by using optical circulators. Interfaces which are connected to each side of the optical switch can be connected.

As an example of a technique in which a hardware scale upon expansion is reduced in an apparatus for editing circuit at an electrical level, there is JP-A-2002-77238.

SUMMARY OF THE INVENTION

To increase the freedom degree of the connection among the lines, it is required that the node apparatus arbitrarily connects the lines accommodated in its own apparatus. However, in the case of configuring the optical switch of the large scale by combining the optical switches of the small scale, since the plurality of optical switches are connected, a restriction occurs in the paths of the optical signals which can be set and there are lines which cannot be connected.

An interface with an optical transmission line is connected to a base switch through an optical circulator, thereby enabling the interfaces connected to the base switch to be arbitrarily connected. Further, by constructing in such a manner that the optical signal which is transmitted from the interface toward the base switch is guided to an expanding switch by a selector, the interfaces which are connected to the expanding switch but are not connected to the same base switch can be also arbitrarily connected.

According to an optical switch and an optical crossconnect apparatus of the invention, by connecting three optical switches of a scale of (k×k) by using a selection switch and optical circulators, the connection of 2k interfaces can be realized by the elements of the number smaller than that in the case of the 3-stage configuration in the related art. Therefore, an optical switch in which hardware of the optical switch can be reduced, control can be simplified, and a scale of the optical switch is expandable can be realized.

Other objects, features and advantages of the invention will become apparent from the following

BRIEF DESCRIPTION OF THE DRAWINGS

FIG. 8 is a diagram showing an embodiment of optical switch connection information.

DETAILED DESCRIPTION OF THE INVENTION

Figure 1:
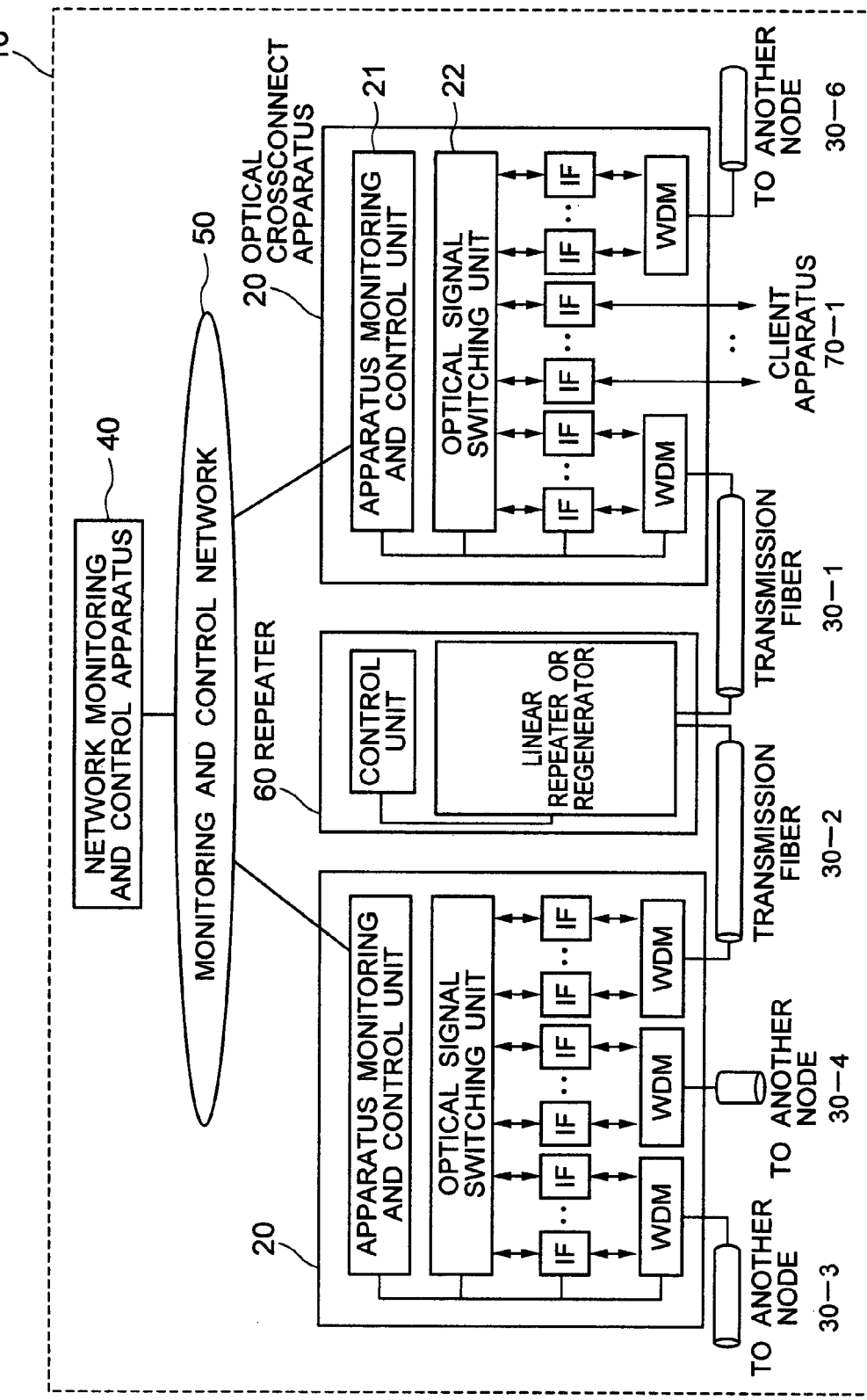
FIG. 1 is a diagram showing an example of an optical network.

An optical crossconnect apparatus as an embodiment of the invention will be described in detail hereinbelow with reference to the drawings. FIG. 1 is a diagram showing an example of an optical network to which the optical crossconnect apparatus of the invention can be applied. In FIG. 1, an optical network 10 is constructed by: an optical crossconnect apparatus 20; a transmission line 30 connecting the optical crossconnect apparatus 20; a network monitoring and control apparatus 40; a monitoring and control network 50 for transmitting and receiving a monitoring and control signal between the network monitoring and control apparatus 40 and the optical crossconnect apparatus 20; and a repeater 60 provided between transmission lines. In the embodiment, the number of transmission line fibers which are connected to the optical crossconnect apparatus 20 is merely shown as an example. A larger number of transmission line fibers may be accommodated in the optical crossconnect apparatus 20.

The network monitoring and control apparatus 40 performs a configuration management, a fault management, a bandwidth management, a performance management, a security management, and the like of the optical network 10. For example, in order to assure a communication bandwidth according to a demand between arbitrary optical crossconnect apparatuses 20, the network monitoring and control apparatus 40 inquires of an apparatus monitoring and control unit 21 of the optical crossconnect apparatus 20. Also by referring to configuration management information including information such as a activity situation and the like of each function of the optical crossconnect apparatus 20 and fault management information including information of the transmission line fiber 30 in which a fault has occurred and information of the optical crossconnect apparatus 20, the network monitoring and control apparatus 40 selects usable resources of the relevant optical crossconnect apparatus and a route in which no fault occurs, controls a plurality of optical crossconnect apparatuses including the relevant optical crossconnect apparatus, and sets a communication path or a path having the requested communication bandwidth. In this manner, the network monitoring and control apparatus 40 collects the information of the optical transmission line fiber and each optical crossconnect apparatus and issues an instruction to the optical crossconnect apparatus 20 so as to form the transmission path of the optical signal into the optical network 10. In response to such an instruction, the optical crossconnect apparatus 20 controls the optical switches in the apparatus so as to connect the requested transmission lines.

The network monitoring and control apparatus 40 can be constructed by one apparatus or may be constructed by a centralized control system by using a plurality of apparatuses such as redundant servers or the like. It is also possible to use a distributed control system in which the apparatus monitoring and control units 21, which will be described hereinafter, in the optical crossconnect apparatus 20 communicate and exchange state information of the network and execute a routing calculation. In the case of using the distributed control system, the network monitoring and control apparatus 40 can be omitted or simplified. For example, as such an inter-apparatus communication control technique, a protocol group of what is called GMPLS (Generalized MultiProtocol Label Switching) specified in RFC3471-3473 or the like of IETF (The Internet Engineering Task Force) can be used.

The linear repeater 60 for performing a regeneration or a linear repeat for extending a transmission distance is provided between the optical crossconnect apparatuses 20 through the transmission line fiber 30. The repeater 60 is arranged at a proper distance interval according to the transmission distance, a type of fiber, and a position of an office so as to keep predetermined main signal quality. The main signal quality reference is set so that, for example, a bit error rate is equal to 10-12 or less. There is also a case where a plurality of repeaters 60-1 are arranged between the optical crossconnect apparatuses. The regenerator temporarily converts the optical signal propagated on the transmission line into an electric signal and executes a reshaping, a digital quality monitoring, that is, a bit error monitoring by a method called a BIP (Bit Interleaved Parity), and the like. The linear repeater amplifies the wavelength multiplexed signals simultaneously by an optical fiber amplifier using, for example, an erbium-doped fiber, Raman amplification, or the like. An optical semiconductor amplifier instead of the optical fiber amplifier may be used. As a repeater, what is called an optical 2R or optical 3R repeater which provides an improving effect of the reshaping and a signal-to-noise ratio by using a nonlinear effect or the like in the fiber or the semiconductor without converting the optical signal into the electric signal can be also used so long as such a repeater has the function which can extend the transmission distance. The repeater can be also constructed in such a manner that only a desired one of a plurality of paths is added/dropped by using a multiplexing/demultiplexing filter and an optical switch. Particularly, there is a case where an apparatus for executing the adding/dropping process mentioned above without converting the optical signal into the electric signal is called OADM (Optical Add Drop Multiplexer).

Figure 2:
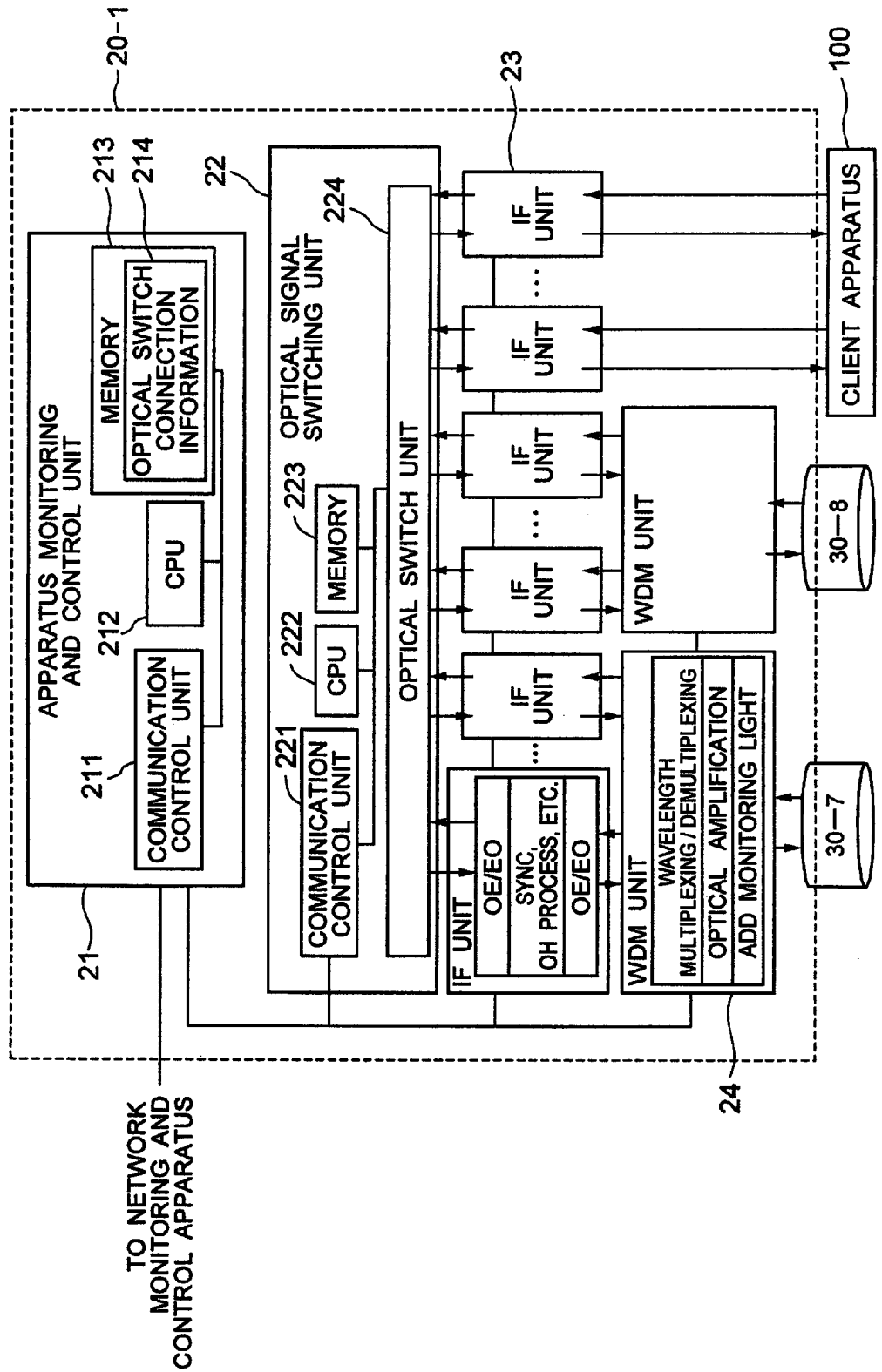
FIG. 2 is a diagram showing an embodiment of an optical crossconnect apparatus.

FIG. 2 shows an embodiment of a detailed construction of the foregoing optical crossconnect apparatus 20. An optical crossconnect apparatus 20-1 is constructed by: the apparatus monitoring and control unit 21; an optical signal switching unit 22 for switching the main signal; a plurality of interface (I/F) units 23 for executing, as necessary, a process of an overhead added to the main signal, the main signal quality monitoring using the foregoing BIP, a process for converting a wavelength of a signal from a client apparatus 100 into a wavelength which is used in a transmission line, and the like; and a WDM unit 24 for wavelength multiplexing outputs of the plurality of I/F units 23 and sending to the transmission line fiber 30.

The apparatus monitoring and control unit 21 has: a communication control unit 211 for communicating with the network monitoring and control apparatus 40 and communicating with another processing unit in the optical crossconnect apparatus 20; a CPU 212 for executing processes necessary for control of the optical crossconnect apparatus; and a memory 213 in which programs and data necessary for the processes of the CPU 212 are stored. For example, the following information has been stored in the memory 213: optical switch connection information 214 showing how the I/F units 23 and an optical switch unit 224 have been connected; and other information such as configuration management information including the information such as a activity situation and the like of each function in the optical crossconnect apparatus 20, fault management information including the information of the transmission line fiber 30 in which the fault has occurred and the information of the optical crossconnect apparatus 20, and the like. For example, information showing types, the number of units, and attaching positions of the I/F units, the WDM unit, the switch unit, and the apparatus monitoring and control unit may be added to the configuration management information. The optical switch connection information 214 may be manually inputted by an administrator from the network monitoring and control apparatus 40 or from a control terminal connected to the apparatus monitoring and control unit 21 or can be also constructed in such a manner that an automatic detecting function of the connection configuration is provided for the apparatus side so that the apparatus can be automatically detected when the apparatus is attached. In the case where the apparatus monitoring and control units 21 in the different optical crossconnect apparatuses 20 communicate and execute the routing calculation or the like, it is sufficient to hold the network construction information, path information, and the like into the memory 213. Various arithmetic operations such as a routing calculation and the like can be executed in the CPU 212. The memory 213 can be realized by a commercially available hard disk or semiconductor memory.

The optical signal switching unit 22 has: a communication control unit 221 for communicating with the apparatus monitoring and control unit 21; a CPU 222 for controlling the optical switch unit 224; a memory 223 in which information necessary for the control of the optical switch unit is stored; and the optical switch unit 224. The embodiment has a construction in which the CPU 222 and the memory 223 are also provided for the optical switch unit and an optical signal switching unit can autonomously switch the path of the optical signal to a certain degree. However, it is also possible to use a construction in which the optical switch unit 224 is directly controlled by the CPU 212 and the memory 213 in the apparatus monitoring and control unit 21 and the CPU 222 and the memory 223 are omitted.

The I/F unit 23 converts the optical signal into the electric signal and executes a synchronism adjustment, an overhead process, and the like of the signal as necessary. In the embodiment, the path switching process of the optical signal is executed in the optical switch unit 224 by using the I/F unit 23 as a unit. There is also a case where the I/F unit 23 executes a forward error correction as shown in, for example, the ITU recommendation G.709 in order to compensate a quality deterioration caused by other factors such as increase in transmission distance, seasonal fluctuation of the fiber, loss fluctuation due to a physical external force, aging deterioration of parts, and the like. The I/F unit 23 has functions for accommodating the signals from the client apparatus 100 using, for example, STM-16 (2.5 Gbits/sec), STM-64 (10 Gbits/sec), and STM-256 (40 Gbits/sec) as an interface, converting into signals corresponding to OTU-1 (2.7 Gbits/sec), OTU-2 (10.7 Gbits/sec), and OTU-3 (42.8 Gbits/sec) specified in the ITU-T G.709 OTN and having wavelengths specified by ITU-T, and outputting to the WDM unit or functions for converting signals from the WDM unit 24 in a manner opposite to that mentioned above. The I/F unit 23 may have a function for regenerating signals of OTU-n (n=1, 2, 3) for a signal which is transferred from one transmission line to another transmission line in a certain optical crossconnect apparatus 20. As other client signals, for example, GbE (1 Gbits/sec) specified by IEEE 802.3z and 10 GbE (10.3 Gbits/sec) specified by IEEE 802.3ae can be also accommodated. In such a case, a transmission rate of the interface with the WDM unit is a rate obtained by adding a ratio corresponding to the error correction amount, for example, about 7% to each of those values. Such a ratio can be properly changed according to necessary correcting ability.

The WDM unit 24 wavelength multiplexes the optical signals from the I/F units 23, amplifies them as necessary, sends the amplified signals to the transmission line fiber 30, wavelength demultiplexes the wavelength multiplexed signal from the transmission line fiber 30, and sends to the I/F units 23. The I/F units are not necessarily connected to the WDM unit 24 and it is also possible to construct in such a manner that the optical signals of the I/F units 23 are inputted/outputted to/from an apparatus out of the optical crossconnect apparatus without being wavelength multiplexed or demultiplexed. Further, the WDM unit 24 amplifies the signals before the transmission to the I/F units 23 before or after the wavelength demultiplexing or wavelength multiplexes or demultiplexes a monitoring and control signal to the main signal as necessary. A power of the optical signal when it is sent to the transmission line fiber 30 is determined in consideration of the number of wavelengths, a loss between the arbitrary optical crossconnect apparatuses, an OSNR (Optical Signal-to-Noise Ratio) depending on a noise figure of an optical amplifier, a waveform distortion and a degree of an increase in noises due to a nonlinear effect in the fiber. As a nonlinear effect, an SPM (Self Phase Modulation), an XPM (Cross Phase Modulation), and an FWM (Four Wave Mixing) are known. A waveform distortion amount depends on the number of wavelengths, dispersion of the fiber, a nonlinear constant, and the like. The dispersion of the fiber and the nonlinear constant differ in dependence on whether the fiber is in a single mode (SMF) or is a dispersion shift fiber (DSF). Even in the case of the same DSF, an individual difference also exists. An output power of the amplifier before the signal is transmitted to the I/F unit 23 is determined in consideration of a dynamic range or a receiver sensitivity of a receiver.

A dispersion compensator for compensating the waveform distortion caused by the wavelength dispersion of the fiber can be also assembled into the WDM unit 24. As a dispersion compensator, a dispersion compensating fiber whose sign differs from that of the transmission line fiber or a dispersion compensator using a fiber diffraction grating, an optical lens, a resonator, or the like is commercially available. As a wavelength which is outputted from the WDM, for example, a wavelength on a wavelength grid which is specified in the ITU-U recommendation G694.1 or G694.2 can be used. As the number of wavelengths, an arbitrary value can be selected from 8, 16, 20, 40, 64, 80, 128, 160, and the like by devising transmitting conditions.

Figure 3:
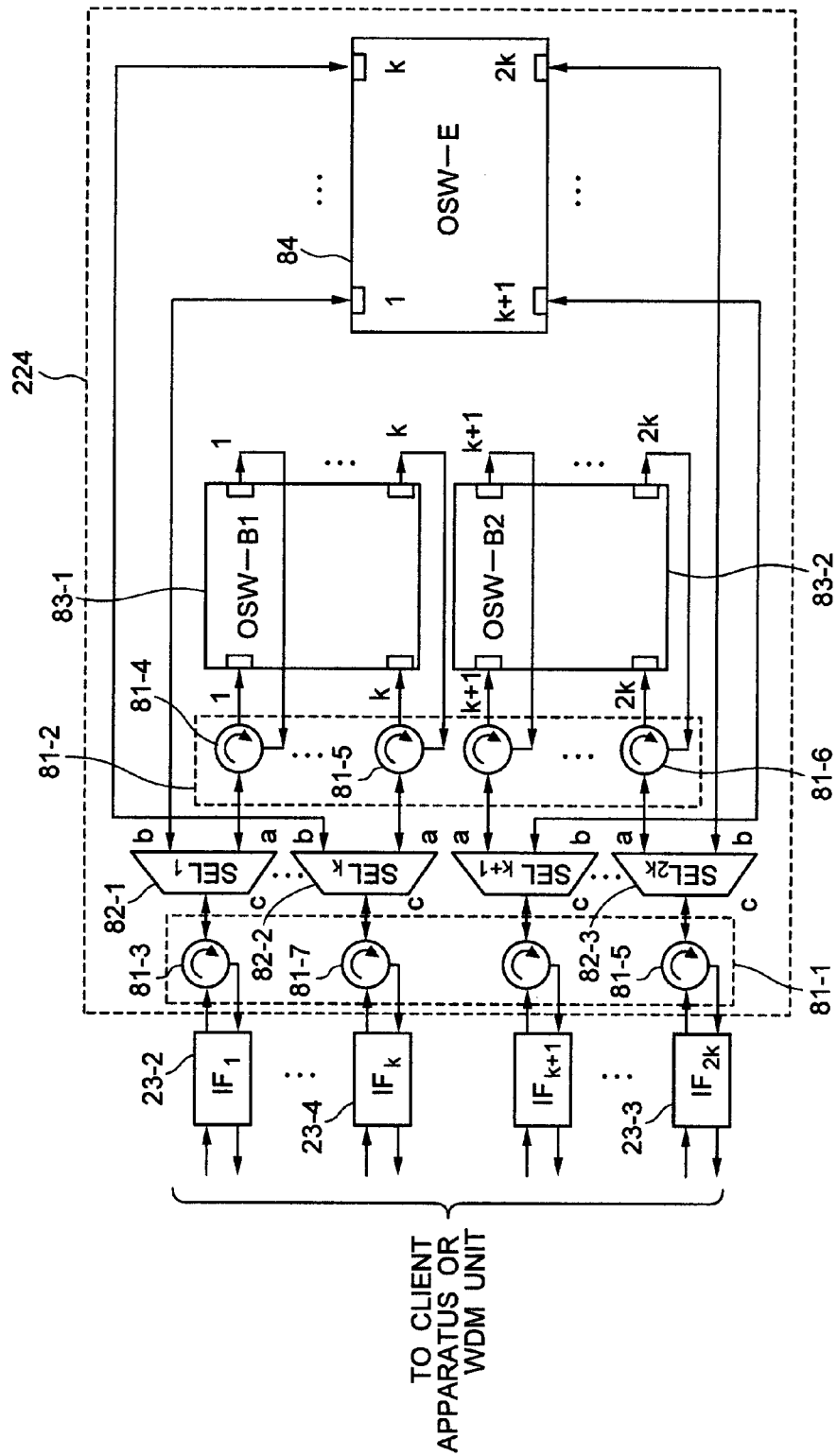
FIG. 3 is a diagram showing an embodiment of an optical switch.

FIG. 3 shows an example of a construction of the optical switch unit 224 in the optical crossconnect apparatus 20 in the embodiment. In FIG. 3, the optical switch unit 224 is constructed by: a first base switch (OSW-B1) 83-1 having ports of k inputs and k outputs; a second base switch (OSW-B2) 83-2 having ports of k inputs and k outputs; an expanding switch (OSW-E) 84 having bi-directional transmitting performance which has 2k ports and can connect arbitrary ports in a one-to-one corresponding relational manner between the first to kth ports and the (k+1)th to 2kth ports; 2k first optical circulators 81-1 each having three ports; 2k second optical circulators 81-2 similarly each having three ports; and 2k selecting switches (SEL) 82 each of which has a first port, a second port, and a common port and can arbitrarily connect any one of the first port, second port, and common port.

In the embodiment of FIG. 3, the first to kth I/F units 23 are a group of I/F units 23 which are connected through the base switch 83-1. The (k+1)th to 2kth I/F units 23 are a group of I/F units 23 which are connected through the base switch 83-2. To describe the specific connecting relation hereinbelow, a connecting relation between the optical switch unit 224 and a first I/F unit 23-2 and a connecting relation between the optical switch unit 224 and a second interface are illustrated.

First, a connection of each port of a first optical circulator 81-3 which is connected to the base switch 83-1 (OSW-B1) will be described. A first port of the first optical circulator 81-3 is connected to an output of the I/F unit 23-2 (IF1), a third port is connected to an input of the I/F unit 23-2, and a second port is connected to a common port (c) of a selecting switch 82-1 (SEL1), respectively. Subsequently, a connection of each port of the selecting switch 82-1 will be described. A first port (a) of the selecting switch 82-1 is connected to a first port of a second optical circulator 81-4 and a second port (b) is connected to a first bi-directional port of the expanding switch 84. Subsequently, a connection of each port of the second optical circulator 81-4 will be described. A second port of the second optical circulator 81-4 is connected to a first input port of the first base switch 83-1 and a third port is connected to a first output port of the first base switch 83-1.

Subsequently, a connecting relation of each port of a 2kth first optical circulator 81-5 which is connected to the base switch 83-2 (OSW-B2) will be described. A first port of the first optical circulator 81-5 is connected to an output of an I/F unit 23-3 (IF2k), a third port is connected to an input of the I/F unit 23-3, and a second port is connected to a common port (c) of a selecting switch 82-3 (SEL2k), respectively. Subsequently, a connecting relation of each port of the selecting switch 82-3 will be described. A first port (a) of the selecting switch 82-3 is connected to a first port of a second optical circulator 81-6 and a second port (b) of the selecting switch 82-3 is connected to a 2kth bi-directional port of the expanding switch 84 (OSW-E). Subsequently, a connecting relation of the second optical circulator 81-6 will be described. A second port of the second optical circulator 81-6 is connected to a 2kth input port of the second base switch 83-2 and a third port of the second optical circulator 81-6 is connected to a 2kth output port of the second base switch 83-2.

As shown in FIG. 3, a connecting relation in the optical switch unit 224 in each of the second to kth I/F units 23 is similar to that of the first I/F unit 23-2 mentioned above. A connecting relation in the optical switch unit 224 in each of the (k+1)th to (2k−1)th I/F units 23 is similar to that of the 2kth I/F unit 23-3 mentioned above.

Figures 4A, 4B:
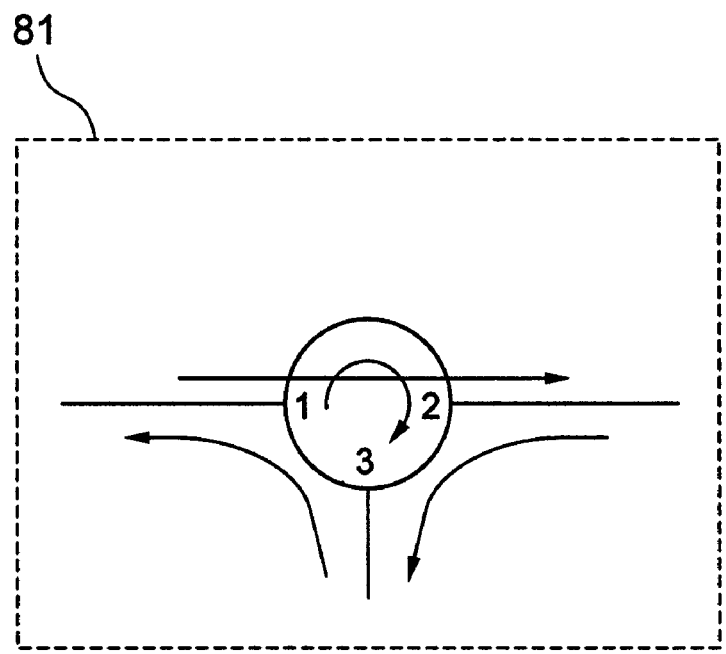
FIGS. 4A and 4B are diagrams showing an input/output relation of an optical circulator.

FIGS. 4A and 4B show the operation of an optical circulator 81 shown in FIG. 3. In the optical circulator 81, an input/output relation of light shows circulating performance. That is, the optical circulator 81 is a commercially available optical part in which an input from a port 1 is outputted to a port 2, an input from the port 2 is outputted from a port 3, and an input from the port 3 is outputted from the port 1. There are several constructing methods. The optical circulator 81 is constructed by, for example, a polarization beam splitter, a polarization rotator, a prism, and the like.

Figure 5:
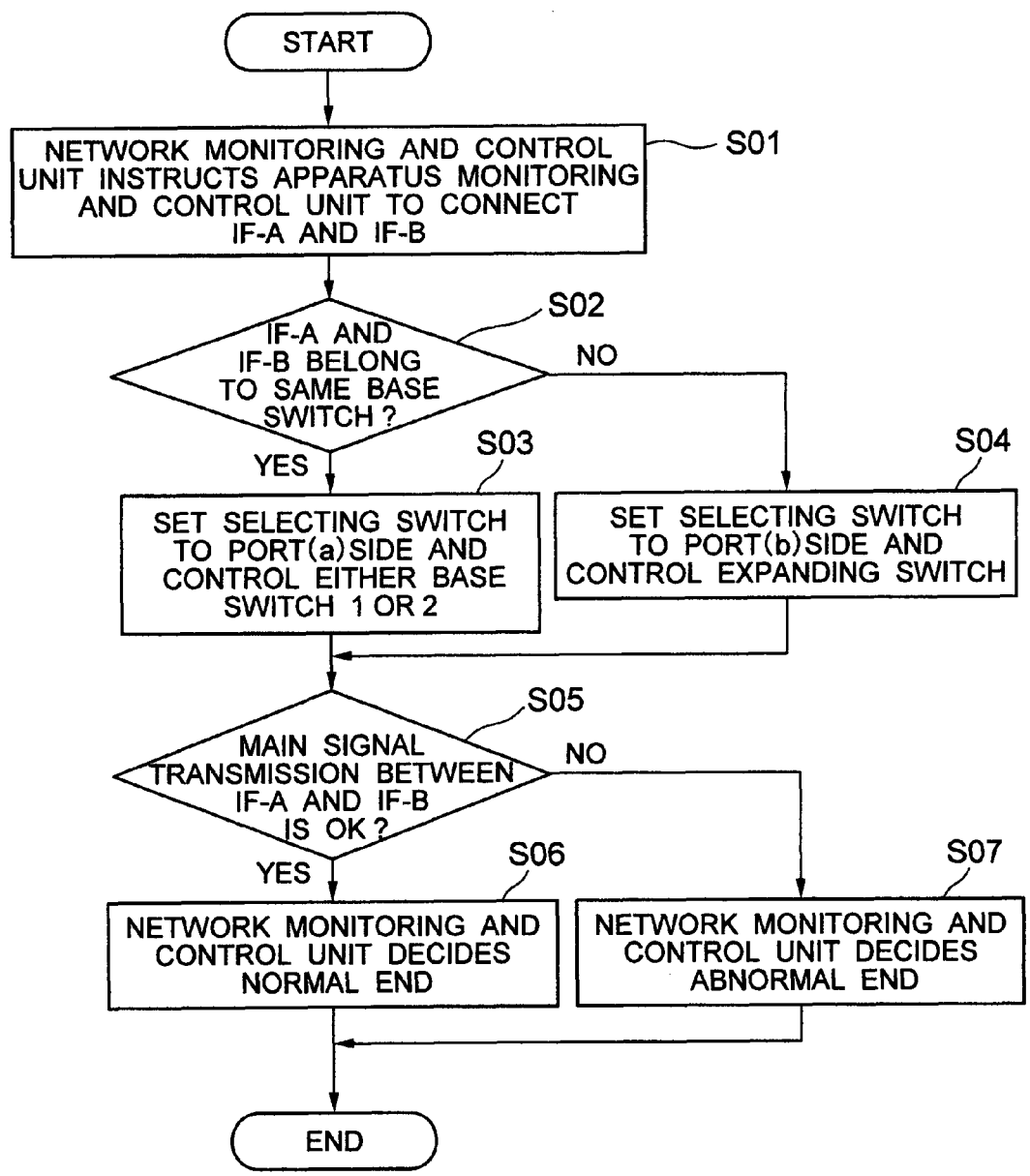
FIG. 5 is a flowchart showing an embodiment of a control sequence of the optical switch.

A connecting procedure of the I/F units 23 by an optical signal path switching using the optical switch unit 224 in the embodiment shown in FIG. 3 will now be described with reference to FIGS. 5 to 7. FIG. 5 shows a control sequence of the optical switch unit 224 in the embodiment shown in FIG. 2.

First, when an optical path is set, for example, the network monitoring and control apparatus 40 shown in FIGS. 1 and 2 instructs the apparatus monitoring and control unit 21 to allow each optical crossconnect apparatus 20 to connect two arbitrary I/F units IF-A and IF-B among a plurality of I/F units 23 (step S01). The apparatus monitoring and control unit 21 which received the instruction refers to the optical switch connection information 214 and confirms to which one of the base switches 83-1 and 83-2 the I/F units IF-A and IF-B have been connected.

As shown in FIG. 8, the optical switch connection information 214 has information for discriminating to which one of the selecting switches 82 (SEL), to which one of base switches 83 (OSW-B), and to which one of ports of expanding switches 84 (OSW-E) each of the I/F units 23 has been connected.

An apparatus monitoring and control unit 21-1 discriminates whether or not the I/F units IF-A and IF-B have been connected to the same base switch 83 (S02). If it is determined by the above discrimination that the two I/F units have been connected to the same base switch 83 (YES as a processing result of S02), the apparatus monitoring and control unit 21 controls the selecting switches 82 to which the IF-A and IF-B have been connected so as to connect the ports (c) and (a) in such a manner that connecting destinations of the IF-A and IF-B are set to the same base switch 83 (S03).

Figure 6:
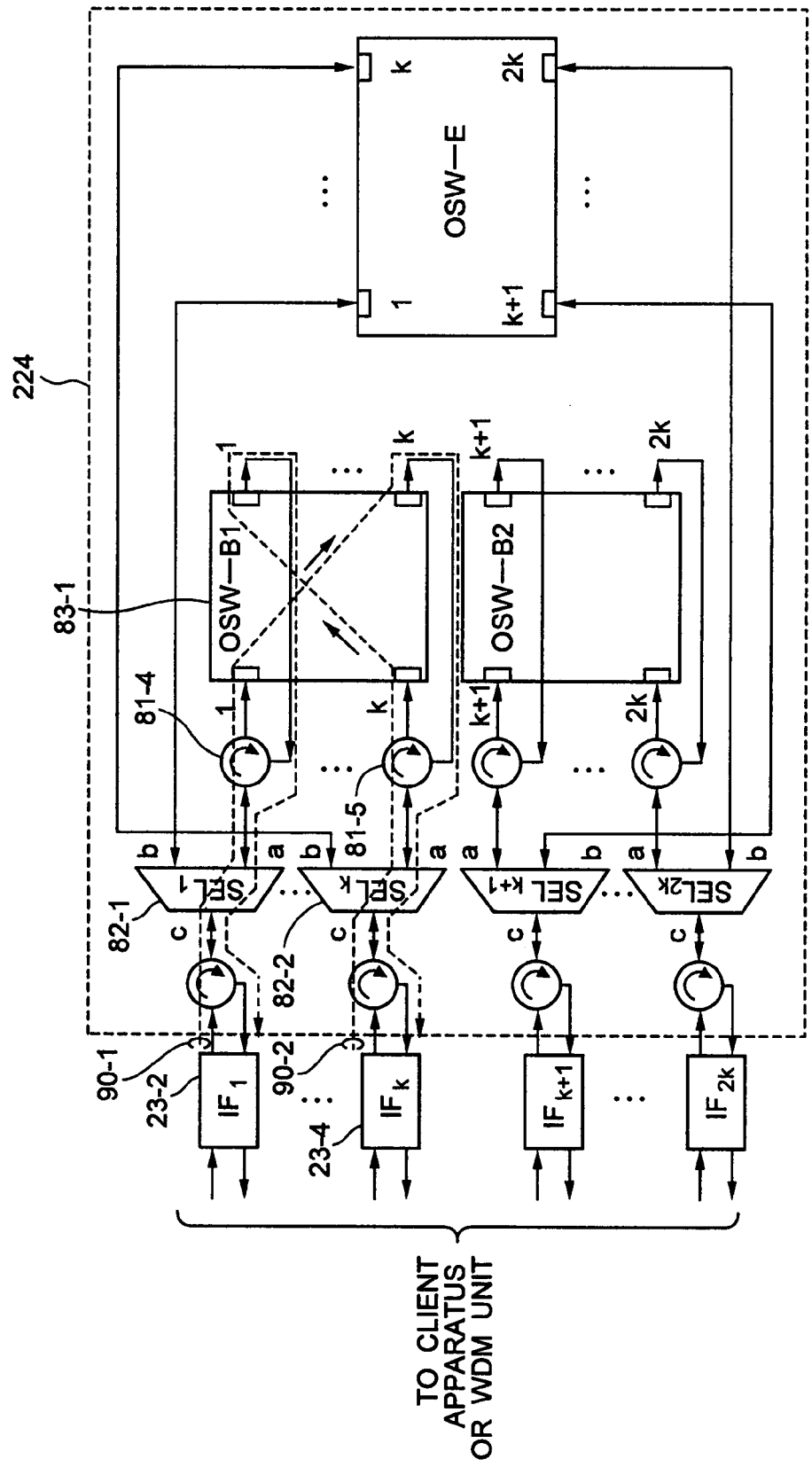
FIG. 6 is a diagram showing an embodiment of an optical crossconnect state.

FIG. 6 shows a connecting construction of the switches in the case where the IF-A is the I/F unit 23-2 (IF1) and the IF-B is an I/F unit 23-4 (IFk). As shown by an optical signal path 90-1, an optical signal outputted from the I/F unit 23-2 is transmitted from a first port of the first optical circulator 81-3, passes through its third port, and is inputted to the common port (c) of the selecting switch 82-1 (SEL1). By referring to the optical switch connection information 214, the apparatus monitoring and control unit 21 determines that both of the I/F units 23-2 and 23-4 have been connected to the base switch 83-1 (OSW-B1), and preliminarily connects the ports (c) and (a) of the selecting switch 82-1 corresponding to the I/F unit 23-2 and a selecting switch 82-2 (SELk) corresponding to the I/F unit 23-4. Therefore, the optical signal inputted to the port (c) of the selecting switch 82-1 is outputted from the port (a), is inputted to the first port of the second optical circulator 81-4, passes through its third port, and is inputted to the port 1 of the first base switch 83-1.

To connect the IF-A and IF-B, the apparatus monitoring and control unit 21 refers to the optical switch connection information and preliminarily connects an input port 1 and an output port k of the base switch 83-1 connected to those I/F units 23. The optical signal which is outputted from the port k of the base switch 83-1 is transmitted from the third port of the first optical circulator 81-5, passes through its first port, and is inputted to the port (a) of the selecting switch 82-2. The port (a) of the selecting switch 82-2 has been connected to the port (c) as mentioned above. Therefore, the optical signal inputted from the port (a) of the selecting switch 82-2 is outputted from the common port (c), is transmitted from a third port of an optical circulator 81-7, passes through its first port, and is connected to the I/F unit 23-4 as an IF-B. By the operation similar to that mentioned above, the optical signal outputted from the I/F unit 23-4 is finally inputted to the I/F unit 23-2 as an IF-A as shown by an optical signal path 90-2 of the optical signal. In this manner, the bi-directional connection of the I/F units 23-2 and 23-4 is realized.

After that, the apparatus monitoring and control unit 21 monitors the signal by, for example, counting the number of bit errors of the signal by the I/F units 23-2 and 23-4 or referring to trace information inserted in the overhead and transmits a monitoring result to a network monitoring and control apparatus 40-1. The network monitoring and control apparatus 40-1 compares the transmitted monitoring result with a predetermined threshold value which is used to discriminate normality, or the like, hereby discriminating whether or not a optical signal transmission between the IF-A and IF-B has been accomplished by predetermined quality (S05).

If the monitoring result indicates normality, the network monitoring and control apparatus 40-1 determines that a path setting process has normally been finished (S06). The processing routine is finished. If the optical signal transmission between the IF-A and IF-B is abnormal, the network monitoring and control apparatus 40-1 determines that the path setting process has abnormally been finished (S07). The processing routine is finished.

The above embodiment has been described with respect to the case where the two I/F units 23 which are connected have been connected to the same base switch 83. A case where the two I/F units 23 whose connection has been instructed by the network monitoring and control apparatus 40 have been connected to the different base switches 83 will now be described. A case where the IF-A and IF-B belong to the different base switch 83 in the process (S02) in FIG. 5 and a processing result of (S02) indicates NO will be described.

Such a situation corresponds to a case where, for example, the IF-A is the I/F unit 23-2 (IF1) and the IF-B is the I/F unit 23-3 (IF2k). In this case, by referring to the optical switch connection information, the apparatus monitoring and control unit 21 determines that the I/F units 23-2 and 23-4 have been connected to the different base switch 83-1 (OSW-B1) and base switch 83-2 (OSW-B2). Thus, the apparatus monitoring and control unit 21 controls the expanding switch 84 (OSW-E) in such a manner that the ports (c) and (b) of the selecting switches 82-1 (SELL) and 82-3 (SEL2k) connected to the I/F units 23-2 and 23-3 are connected and a port 1 connected to the I/F unit 23-2 and a port 2k connected to the I/F unit 23-3 are connected (S04).

By controlling in this manner, the output signal from the I/F unit 23-2 is inputted to the I/F unit 23-3 along an optical signal path 90-3 and the output signal from the I/F unit 23-3 is inputted to the I/F unit 23-2 along an optical signal path 90-4, so that the bi-directional connection of the I/F units 23-2 and 23-4 is realized. Processes of S05 to S07 are similar to those in the description in the case of connecting the I/F units 23-2 and 23-4 mentioned above.

According to the foregoing operation, by setting the selecting switch 82 to the port (a) side, the first to kth I/F units 23 connected to the base switch 83-1 can be connected in an arbitrary combination so long as the base switch 83-1 is non-blocking. By setting the selecting switch 82 to the port (a) side, the (k+1)th to 2kth I/F units 23 connected to the base switch 83-2 can be connected as an arbitrary combination so long as the base switch 83-2 is non-blocking.

Further, by setting the selecting switch 82 to the port (b) side, an arbitrary one of the first to kth I/F units 23 connected to the ports 1 to k of the expanding switch 84-1 can be connected to an arbitrary one of the (k+1)th to 2kth I/F units 23 connected to the ports k+1 to 2k of the expanding switch 84 as an arbitrary combination so long as the expanding switch 84 is non-blocking. That is, according to the optical switch 22 of the invention, the two base switches each having k inputs and k outputs and the one expanding switch which has the bi-directional transmitting performance and has the 2k ports and in which the first to kth ports can be connected to any one of the (k+1)th to 2kth ports are constructed as mentioned above by using the 2k selecting switches and the 4k optical circulators, so that the non-blocking optical switch of (2k×2k) can be realized.

As described above, according to the optical switch of the embodiment, by discriminating whether or not the two I/F units 23 as connecting targets belong to the same base switch 83, the two I/F units 23 can be arbitrarily connected by setting the selecting switch 82 of only two ports and by setting the connection of the optical switch of any one of the base switches 83 and the expanding switches 84. Since the optical switch of the large scale in which the (2k×2k) input/output ports can be arbitrarily connected by the combination of such simple optical switches and optical circulators as mentioned above, the control can be simplified as compared with that of the switch configuration of three stages in the related art.

A hardware reducing effect regarding, for example, the optical switch of a (256×256) scale is compared with that of the Clos network having the configuration of three stages. In the case of the Clos network, 16 optical switches of a (16×32) scale and 32 optical switches of a (16×16) scale are necessary. If it is intended to realize such an optical switch by the 3D-MEMS type switch, 1792 (=(16+32)×16+(16+16)×32) switch elements are necessary in principle. In the case of the switch configuration according to the invention, as the optical circulators are removed in this estimation since they are passive parts and their control is unnecessary, it is sufficient to use three 3D-MEMS type switches of a (128×128) scale and 256 optical switches of a (1×2) scale. Therefore, it is sufficient to prepare 1024 (=(128+128)×3+256) optical switches in total. The number of control targets and the hardware scale can be reduced into about 57%.

With respect to the selecting switches 82 in the embodiment, it is sufficient to use the optical switches of the (1×2) scale. Although a semiconductor switch, an LiNO3 switch, a PLC type switch, a movable type optical switch, an MEMS type switch, or the like can be used, naturally, the invention is not limited to them but can use another optical switch so long as it can bi-directionally pass the optical signal.

In order to assure the bi-directional transmitting performance with respect to the expanding switch 84, such an expanding switch 84 can be realized by constructing the switch without using an element such as an optical isolator or the like which restricts the propagating direction of the optical signal onto the path of the optical signal.

Figure 7:
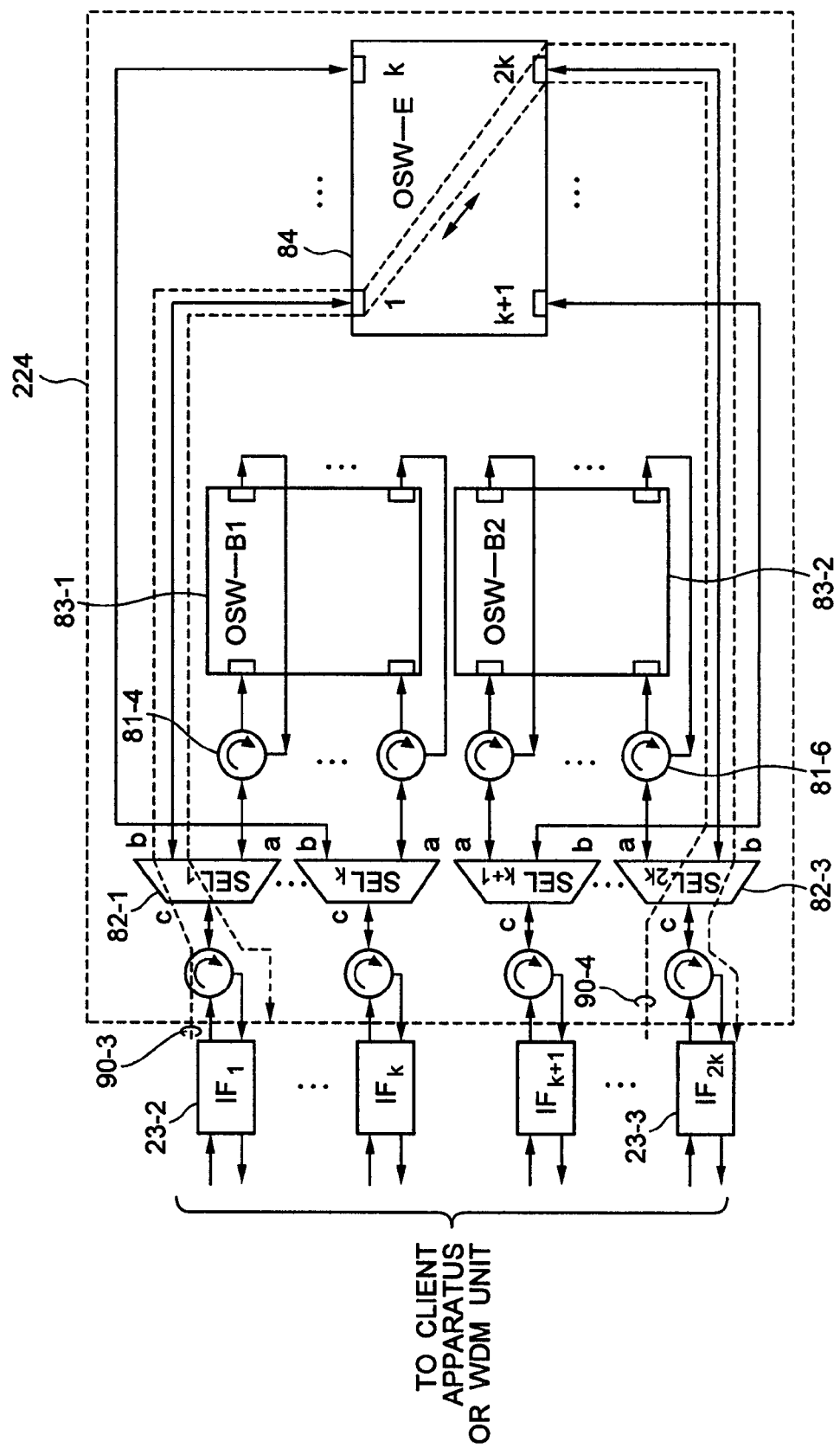
FIG. 7 is a diagram showing another embodiment of an optical crossconnect state.

Although the configuration using two base switches 83 and one expanding switch 84 has been illustrated in FIGS. 3, 6, and 7 in the embodiment, since only a part of them can be also used, the optical switch unit 224 in the embodiment has the excellent expandability. For example, when the number of I/F units 23 lies within a range from 1 to k, if k sets each of which is constructed by serially connecting two optical circulators and one base switch of k inputs and k outputs are prepared, such a combination can be used as a switch of (k×k). By further adding k sets obtained by serially connecting two optical circulators and one second base switch of k inputs and k outputs to the above combination, two combinations can independently operate as switches of (k×k) and 2k interfaces can be accommodated.

Further, by arranging a selecting switch between the two serially-connected circulators and connecting one port of the selecting switch to one expanding switch, the switch can be expanded or upgraded to a switch of (2k×2k) without disturbing the existing paths of the existing two sets of (k×k) switches. If the number of lines to be accommodated decreases, by gradually summarizing the interfaces which are used from the first I/F to the kth I/F, the expanding switches or the second base switch can be reduced.

Since the switch of (2k×2k) is constructed mainly by three switches of the two base switches and the one expanding switch, even if any one of the switches fails, such a failure does not influence on all of the lines accommodated in the optical crossconnect apparatus and there is also such an effect that an infecting range of the switch failure can be limited.

The optical switch and the optical crossconnect apparatus according to the invention are not limited to the embodiment. Although the example in which the WDM function is built in the WDM unit in the optical crossconnect apparatus has been shown in the embodiment, an effect similar to that of the invention is obtained even in the case where the WDM function is not built in.

In the case of combining a plurality of optical switches, by constructing the optical switch unit so that it can be expanded (added), initial costs upon construction of the node are suppressed. By simplifying the switching control of the optical switch unit, the load on the monitoring and control apparatus can be reduced.

It should be further understood by those skilled in the art that although the foregoing description has been on embodiments of the invention, the invention is not limited thereto and various changes and modifications may be made without departing from the spirit of the invention and the scope of the appended claims.

The invention claimed is:

1. A path switching apparatus of optical signals using optical circulators for outputting the optical signals inputted from a first port to a second port, from said second port to a third port, and from said third port to said first port, respectively, comprising:

2k first optical switches each of which has a fourth port, a fifth port, and a sixth port and can set a path of the optical signal between said fourth port and an arbitrary one of said fifth port and said sixth port;

a second optical switch and a third optical switch each of which has k seventh ports and k eighth ports and arbitrarily connects said seventh port and said eighth port in a one-to-one corresponding relational manner;

a fourth optical switch which has a ninth port having k ports and a tenth port having k ports and arbitrarily connects said ninth port and said tenth port in a one-to-one corresponding relational manner;

k first optical circulators in each of which said second port is connected to the seventh port of said second optical switch in a one-to-one corresponding relational manner and said third port is connected to the eighth port of said second optical switch in a one-to-one corresponding relational manner;

k second optical circulators in each of which said second port is connected to the seventh port of said third optical switch in a one-to-one corresponding relational manner and said third port is connected to the eighth port of said third optical switch in a one-to-one corresponding relational manner, wherein with respect to k of said first optical switches, said fifth port and a first port of said first optical circulator are connected in a one-to-one corresponding relational manner and said sixth port is connected to one of said ninth ports of said fourth optical switch in a one-to-one corresponding relational manner, and with respect to remaining k of said first optical switches, said fifth port and a first port of said second optical circulator are connected in a one-to-one corresponding relational manner and said sixth port is connected to one of said tenth ports of said fourth optical switch in a one-to-one corresponding relational manner.

2. An apparatus according to claim 1, wherein a third optical circulator is connected to each of the fourth ports of said first optical switches.

3. An apparatus according to claim 1, wherein
in the case where the path of the optical signal is set between said two first optical switches connected to said first optical circulators,
said first optical switch connects said fourth port and said fifth port, and
with respect to said two first optical circulators connected to said two first optical switches which set the path of the optical signal, said second optical switch connects said seventh port connected to the second port of one of said two first optical circulators and said eighth port connected to the third port of the other first optical circulator.

4. An apparatus according to claim 1, wherein in the case where said first optical switch connected to an arbitrary one of said first optical circulators and said first optical switch connected to an arbitrary one of said second optical circulators are connected,
said first optical switch connects said fourth port and said sixth port, and
with respect to two of the first optical switches which set the path of the optical signal, said fourth optical switch connects said ninth port connected to said sixth port of said first optical switch connected to an arbitrary one of said first optical circulators and said tenth port connected to said sixth port of said first optical switch connected to an arbitrary one of said second optical circulators.

* * * * *